US011942264B2

(12) United States Patent
Park et al.

(10) Patent No.: US 11,942,264 B2
(45) Date of Patent: Mar. 26, 2024

(54) COIL COMPONENT

(71) Applicant: SAMSUNG ELECTRO-MECHANICS CO., LTD., Suwon-si (KR)

(72) Inventors: No Il Park, Suwon-si (KR); Byung Soo Kang, Suwon-si (KR); Seung Mo Lim, Suwon-si (KR); Byeong Cheol Moon, Suwon-si (KR); Boum Seock Kim, Suwon-si (KR); Yong Hui Li, Suwon-si (KR); Seung Min Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 537 days.

(21) Appl. No.: 17/114,987

(22) Filed: Dec. 8, 2020

(65) Prior Publication Data

US 2022/0102061 A1 Mar. 31, 2022

(30) Foreign Application Priority Data

Sep. 25, 2020 (KR) ........................ 10-2020-0124397

(51) Int. Cl.
*H01F 27/29* (2006.01)
*H01F 27/28* (2006.01)
(Continued)

(52) U.S. Cl.
CPC ......... *H01F 27/29* (2013.01); *H01F 27/2804* (2013.01); *H01F 27/323* (2013.01);
(Continued)

(58) Field of Classification Search
CPC .... H01F 27/29; H01F 27/2804; H01F 27/323; H01F 41/041; H01F 41/122;
(Continued)

(56) References Cited

U.S. PATENT DOCUMENTS

| | | | | |
|---|---|---|---|---|
| 11,094,447 | B2 * | 8/2021 | Shimoichi | H01F 41/10 |
| 11,335,496 | B2 * | 5/2022 | Kang | H01F 27/288 |

(Continued)

FOREIGN PATENT DOCUMENTS

| | | |
|---|---|---|
| JP | 2013-526036 A | 6/2013 |
| JP | 2014-197590 A | 10/2014 |

(Continued)

*Primary Examiner* — Bickey Dhakal
*Assistant Examiner* — Matthew T Sarles
(74) *Attorney, Agent, or Firm* — Morgan, Lewis & Bockius LLP

(57) ABSTRACT

A coil component includes a body having a first surface, and a first end surface and a second end surface connected to the first surface and opposing each other in a length direction; a support substrate disposed inside the body; a coil portion comprising a first coil pattern and first and second lead-out patterns, each disposed on a first surface of the support substrate; first and second slit portions, respectively defined on edge portions of the first surface of the body to expose the first and second lead-out patterns; and first and second external electrodes disposed on the first and second slit portions to be connected to the first and second lead-out patterns. At least one of the first and second lead-out patterns has a thickness greater than a thickness of each of the first coil pattern and the first dummy lead-out pattern.

18 Claims, 8 Drawing Sheets

III-III'

(51) Int. Cl.
*H01F 27/32* (2006.01)
*H01F 41/04* (2006.01)
*H01F 41/12* (2006.01)

(52) U.S. Cl.
CPC ......... *H01F 41/041* (2013.01); *H01F 41/122* (2013.01); *H01F 2027/2809* (2013.01)

(58) Field of Classification Search
CPC ..... H01F 2027/2809; H01F 2017/0066; H01F 27/292; H01F 17/0013; H01F 17/0006; H01F 27/022; H01F 27/2871; H01F 27/306; H01F 27/324; H01F 2017/002
See application file for complete search history.

(56) References Cited

U.S. PATENT DOCUMENTS

| | | | | |
|---|---|---|---|---|
| 11,367,561 | B2 * | 6/2022 | Lim | H01F 17/0013 |
| 11,437,180 | B2 * | 9/2022 | Li | H01F 27/2828 |
| 11,456,111 | B2 * | 9/2022 | Kang | H01F 27/29 |
| 11,562,850 | B2 * | 1/2023 | Kang | H01F 41/041 |
| 2014/0009254 | A1 * | 1/2014 | Ohkubo | H01F 17/0033 336/192 |
| 2014/0253277 | A1 * | 9/2014 | Takezawa | H01F 17/0013 336/200 |
| 2015/0048915 | A1 * | 2/2015 | Yoon | H01F 17/0013 336/192 |
| 2015/0102891 | A1 * | 4/2015 | Yoon | H01F 27/2804 336/200 |
| 2015/0137929 | A1 * | 5/2015 | Park | H01F 17/0013 336/200 |
| 2016/0172103 | A1 * | 6/2016 | Jeong | H01F 17/04 29/605 |
| 2016/0217917 | A1 * | 7/2016 | Jeong | H01F 27/292 |
| 2017/0032885 | A1 * | 2/2017 | Lee | H01F 41/046 |
| 2017/0110236 | A1 * | 4/2017 | Jang | H01F 41/10 |
| 2018/0096783 | A1 * | 4/2018 | Fukuda | H01F 27/366 |
| 2018/0182537 | A1 * | 6/2018 | Shimizu | H01F 27/29 |
| 2018/0315541 | A1 * | 11/2018 | Okura | H01F 27/29 |
| 2019/0019615 | A1 * | 1/2019 | Lee | H01F 27/255 |
| 2020/0013540 | A1 * | 1/2020 | Kang | H01F 27/292 |
| 2020/0020477 | A1 * | 1/2020 | Kang | H01F 17/0013 |
| 2020/0035404 | A1 * | 1/2020 | Lim | H01F 17/0013 |
| 2020/0098508 | A1 * | 3/2020 | Park | H01F 17/0013 |
| 2020/0118729 | A1 * | 4/2020 | Lim | H01F 41/041 |
| 2020/0168387 | A1 * | 5/2020 | Kim | H01F 27/292 |
| 2020/0185148 | A1 * | 6/2020 | Yoon | H01F 27/2804 |
| 2020/0194167 | A1 * | 6/2020 | Lee | H01F 27/292 |
| 2020/0294712 | A1 * | 9/2020 | Kim | H01F 17/04 |
| 2020/0312536 | A1 * | 10/2020 | Park | H01F 27/022 |
| 2021/0335532 | A1 * | 10/2021 | Yang | H01F 41/041 |
| 2022/0102061 | A1 * | 3/2022 | Park | H01F 27/323 |
| 2022/0102065 | A1 * | 3/2022 | Yang | H01F 17/0013 |

FOREIGN PATENT DOCUMENTS

| | | | |
|---|---|---|---|
| KR | 10-1548862 | B1 | 8/2015 |
| KR | 10-2021-0132355 | A | 11/2021 |
| WO | 2011/133268 | A1 | 10/2011 |

* cited by examiner

COIL COMPONENT

CROSS-REFERENCE TO RELATED APPLICATION(S)

The present application claims the benefit of priority to Korean Patent Application No. 10-2020-0124397, filed on Sep. 25, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, the number of electronic components used in electronic devices is increased, while being miniaturized.

Conventionally, external electrodes of a coil component are formed on surfaces of a body, opposing each other in a length direction, respectively. Due to thicknesses of the external electrodes, an overall length or width of the coil component may be increased. In addition, when the coil component is mounted on a mounting board, the external electrode of the coil component may be in contact with another component, disposed adjacent to the mounting board, to cause short-circuits.

SUMMARY

An aspect of the present disclosure is to increase an effective volume of a body.

According to an aspect of the present disclosure, a coil component includes a body having one surface, and one end surface and the other end surface connected to the one surface and opposing each other; a support substrate disposed inside the body; a coil portion comprising a first coil pattern and first and second lead-out patterns, respectively disposed on one surface of the support substrate facing the one surface of the body, and a second coil pattern and a first dummy lead-out pattern, respectively disposed on the other surface of the support substrate facing the one surface of the support substrate; a first slit portion and a second slit portion, respectively formed on an edge portion between the one end surface and the one surface of the body and an edge portion between the other end surface and the one surface of the body to expose the first lead-out pattern and the second lead-out pattern; and a first external electrode and a second external electrode disposed to be spaced apart from each other on the one surface of the body, and respectively extending the first slit portion and the second slit portion to be connected to the first lead-out pattern and the second lead-out pattern. At least one of the first and second lead-out patterns has a thickness greater than a thickness of each of the first coil pattern and the first dummy lead-out pattern.

According to another aspect of the present disclosure, a coil component includes a body having a first surface, and a first end surface and a second end surface connected to the first surface and opposing each other in a length direction; a support substrate disposed inside the body; a coil portion disposed on one surface of the support substrate in a thickness direction, the coil portion comprising a coil body and a lead-out pattern extending from one end of the coil body and exposed to the first or second end surface in the length direction; a slit portion defined on an edge portion between the first or second end surface and the first surface of the body to expose the lead-out pattern; and an external electrode disposed on the first surface of the body, and extending onto the slit portion to be connected to the lead-out pattern, wherein the at least one lead-out pattern has at least a portion, a thickness of which is greater than a thickness of the coil body in the thickness direction.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
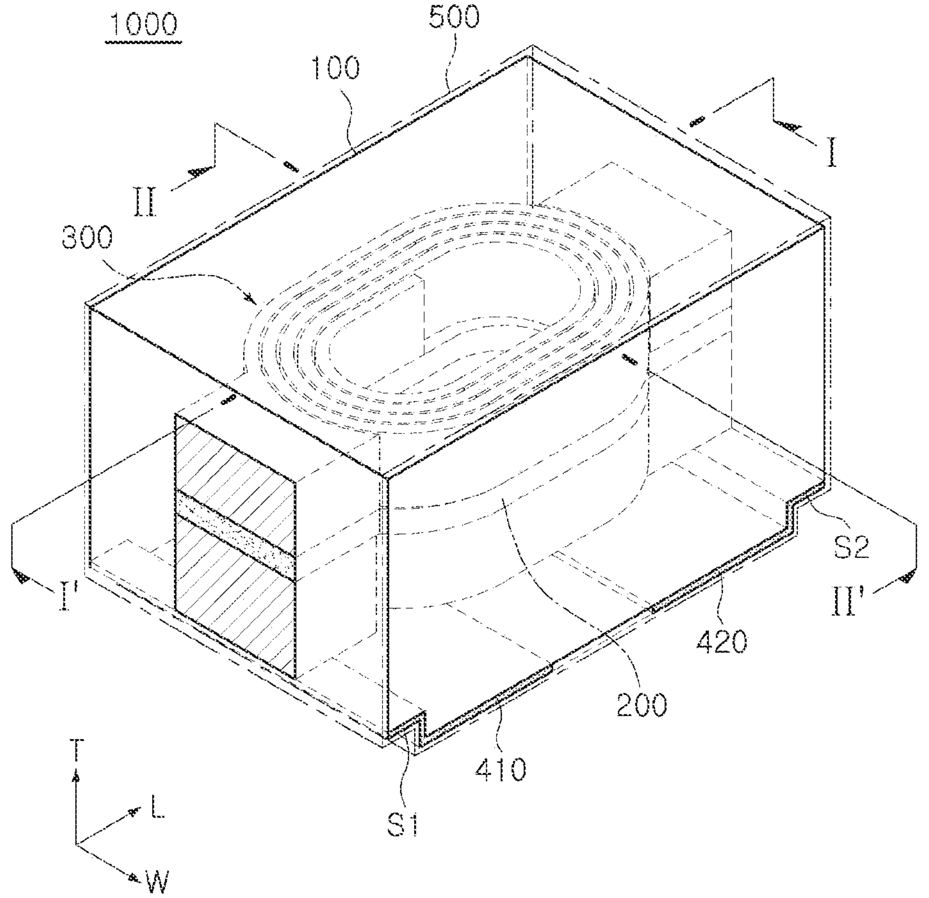
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

One Embodiment

Figure 2:
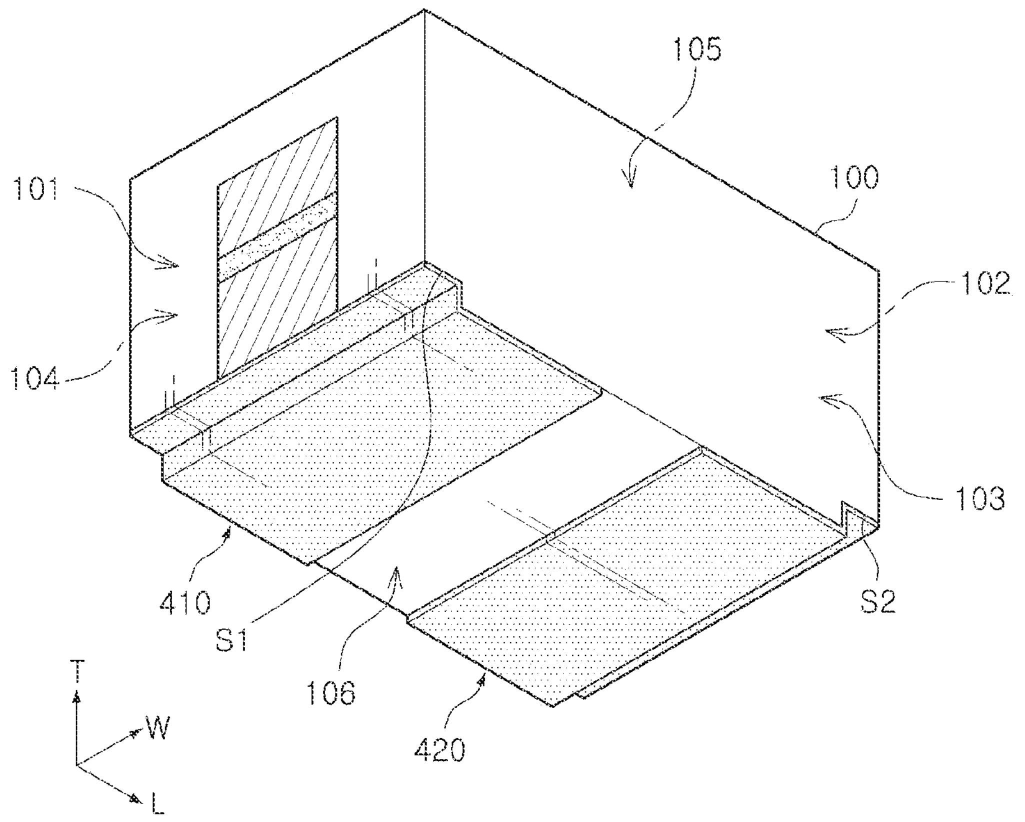
FIG. 2 is a perspective view, in which a portion is omitted from the perspective view of FIG. 1, when viewed from a lower side thereof.
Figure 3:
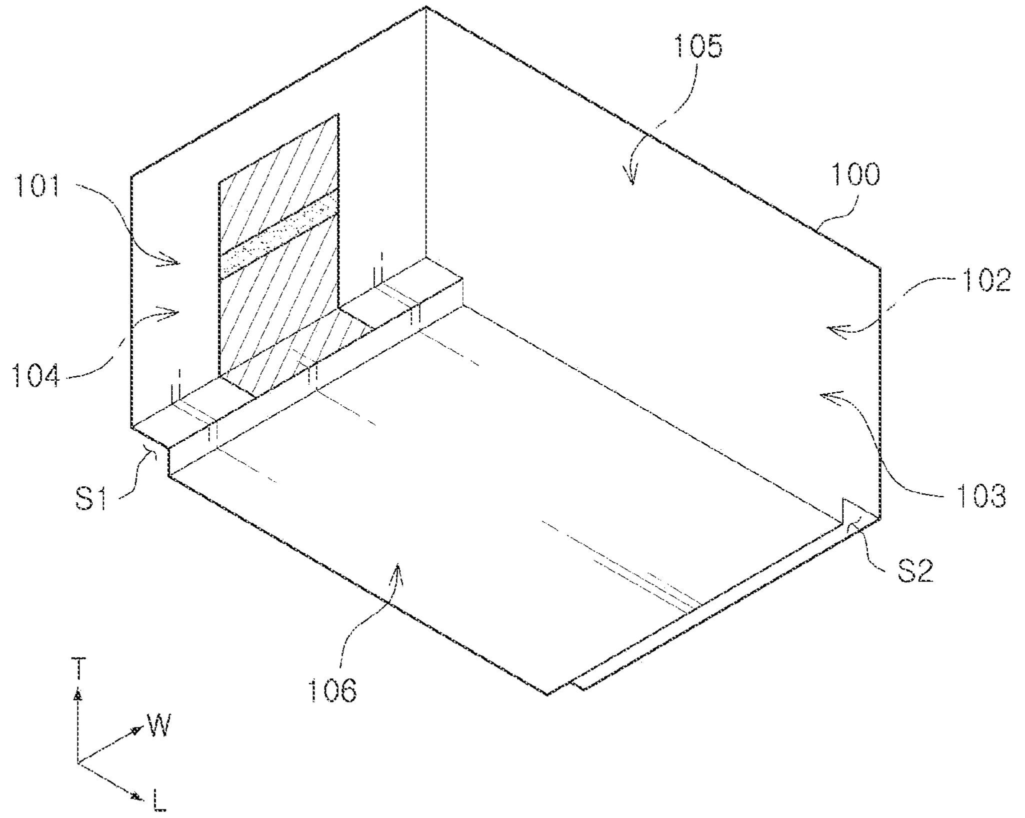
FIG. 3 is a view in which a portion is omitted from the perspective view of FIG. 2.
Figure 4:
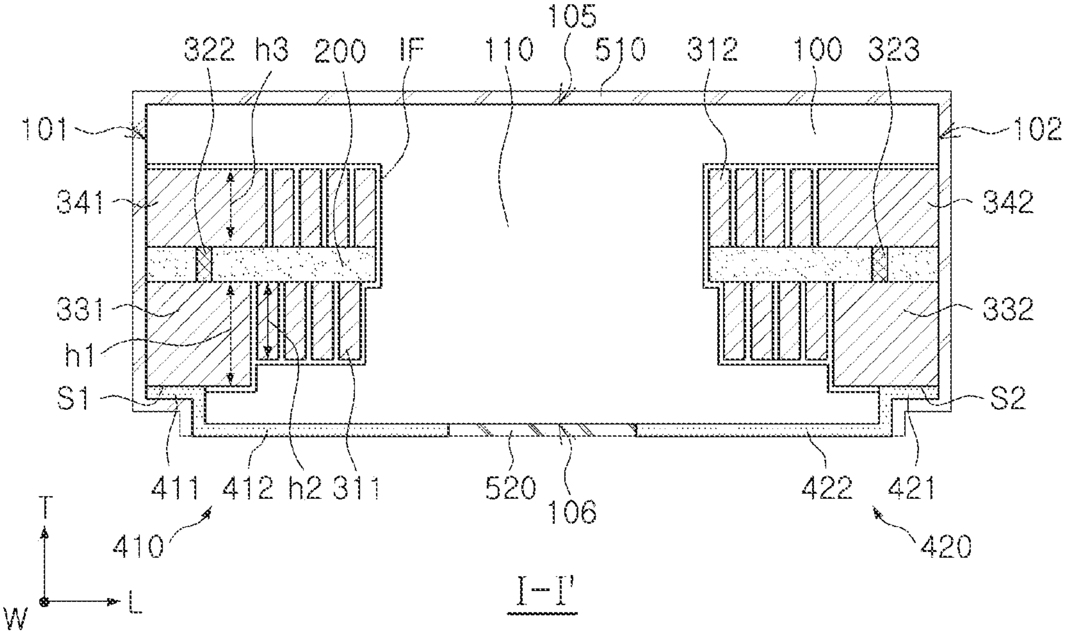
FIG. 4 is a cross-sectional view taken along line I-I' of FIG. 1.
Figure 5:
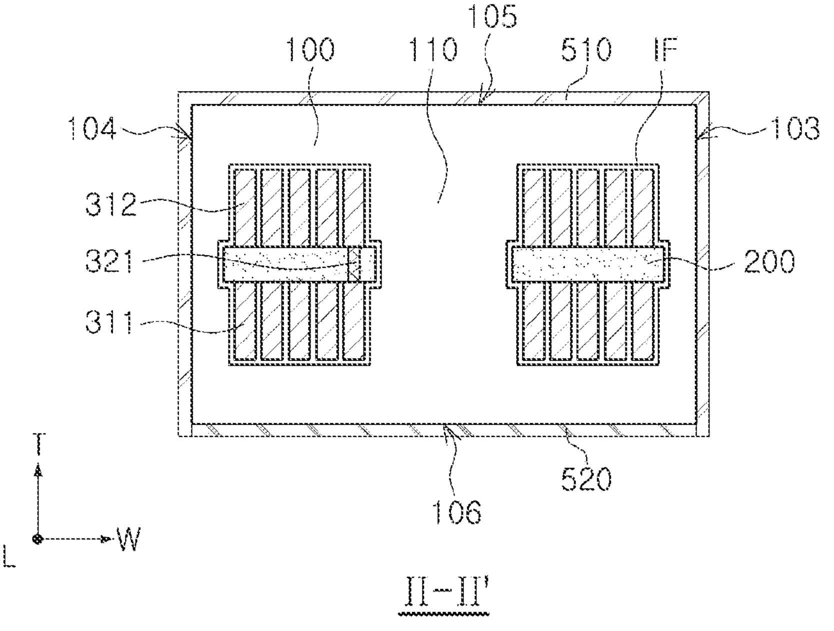
FIG. 5 is a cross-sectional view taken along line II-II' of FIG. 1.

FIG. 1 is a schematic perspective view of a coil component according to an exemplary embodiment. FIG. 2 is a perspective view, in which a portion is omitted from the perspective view of FIG. 1, when viewed from a lower side thereof. FIG. 3 is a view in which a portion is omitted from the perspective view of FIG. 2. FIG. 4 is a cross-sectional view taken along line I-I' of FIG. 1. FIG. 5 is a cross-sectional view taken along line II-II' of FIG. 1.

Referring to FIGS. 1 to 5, a coil component 1000 may include a body 100, a support substrate 200, a coil portion 300, slit portions S1 and S2, and external electrodes 410 and 420.

The body 100 may form an exterior of the coil component 1000, and may embed the support substrate 200 and the coil portion 300 therein.

The body 100 may be formed to have a hexahedral shape overall.

The body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, based on directions of FIGS. 1 to 5. Each of the first to fourth surfaces 101, 102, 103, and 104 of the body 100 may correspond to a wall surface of the body 100 connecting the fifth surface 101 and the sixth surface 106 of the body 100. Hereinafter, both end surfaces (a first end surface and a second end surface) of the body 100 may refer to the first surface 101 and the second surface 102, respectively, and both side surfaces (a first side surface and a second side surface) of the body 100 may refer to the third surface 103 and the fourth surface 104 of the body 100, respectively. In addition, one surface and a lower surface of the body 100 may refer to the sixth surface 106, and the other surface and an upper surface of the body 100 may refer to a fifth surface 105 of the body 100.

As an example, the body 100 may be formed in such a manner that the coil component 1000, including the external electrodes 410 and 420 to be described later, has a length of 2.0 mm, a width of 1.2 mm, and a thickness of 0.65 mm, but the present disclosure is not limited thereto.

The body 100 may include a magnetic material and a resin. Specifically, the body 100 may be formed by laminating at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the magnetic metal powder particle may be a Fe—Si—B—Cr-based amorphous alloy powder, but is not limited thereto.

Each of the magnetic metal powder particles may have an average diameter of about 0.1 μm to 30 μm, but is not limited thereto.

The body 100 may include two or more types of magnetic metal powder particle dispersed in a resin. The term "different types of magnetic powder particle" means that the magnetic powder particles, dispersed in the resin, are distinguished from each other by at least one of average diameter, composition, crystallinity, and shape.

The resin R may include epoxy, polyimide, liquid crystal polymer, or the like, in a single or combined form, but is not limited thereto.

The body 100 may have a core 110 penetrating through the coil portion 300 to be described later. The core 110 may be formed by filling a through-hole in the coil portion 300 with a magnetic composite sheet, but the present disclosure is not limited thereto.

The support substrate 200 may be disposed inside the body 100. The support substrate 200 may be configured to support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photo-imageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide better rigidity. When the support substrate 200 is formed of an insulating material not including glass fibers, the support substrate 200 may be advantageous in thinning the entire coil component 1000. When the support substrate 200 is formed of an insulating material including a photosensitive insulating resin, the number of processes of forming the coil portion 300 may be reduced. Therefore, it may be advantageous in reducing production costs, and a fine via may be formed.

The support substrate 200 may have a thickness of, for example, 10 μm or more to 50 μm or less, but is not limited thereto.

The slit portions S1 and S2 may be formed on edge portions of the sixth surface 106 of the body 100. Specifically, the slit portions S1 and S2 may be formed along edge portions between the first surface 101 and the second surface 102 of the body 100 and the sixth surface 106 of the body 100, respectively. For example, the first slit portion S1 may be formed along the edge portion between the first surface 101 and the sixth surface 106 of the body 100, the second slit portion S2 may be formed along the edge portion between the second surface 102 and the sixth surface 106 of the body 100. The slit portions S1 and S2 may have a shape extending from the third surface 103 of the body 100 to the fourth surface 104 of the body 100. The slit portions S1 and S2 do not extend to the fifth surface 105 of the body 100. For example, the slit portions S1 and S2 do not penetrate through the body 100 in the thickness direction T of the body 100.

The slit portions S1 and S2 may be formed by performing pre-dicing on one surface of a coil bar along an imaginary boundary line matching a width direction of each coil component, among imaginary boundary lines individualizing each coil component, in a coil bar level, a state before each coil component is not individualized. The pre-dicing may adjust depths of the slit portions S1 and S2 such that lead-out patterns 331 and 332 to be described are exposed inwardly of the slit portions S1 and S2. Internal surfaces of the slit portions S1 and S2 may have internal walls, substantially parallel to the first and second surfaces 101 and 102 of the body 100, and bottom surfaces connecting the internal wall to the first and second surfaces 101 and 102 of the body 100. Hereinafter, for ease of description, the slit portions S1 and S2 will be described as having internal walls and lower surfaces, but the present disclosure is not limited thereto. As an example, the internal surface of the first slit S1 may be formed to have a curved shape, connecting the first surface 101 and sixth surface 106 of the body 100 to each other, in a cross section in the length-thickness (L-T) direction such that the internal wall and the lower surface may not be readily apparent.

The internal surfaces of the slit portions also correspond to surfaces of the body 100. However, for understanding of the present disclosure and ease of description, the internal surfaces of the slit portions S1 and S2 will be distinguished from the first to sixth surfaces 101, 102, 103, 104, 105, and 106, i.e., the surfaces of the body 100.

The coil portion 300 may be embedded in the body 100 to exhibit characteristics of the coil component 1000. For example, when the coil component 1000 is used as a power inductor, the coil portion 300 may store an electric field as a magnetic field to maintain an output voltage, serving to stabilize a power supply of an electronic device.

Referring to FIGS. 1, 4, and 5, based on directions of FIGS. 4 and 5, the first coil pattern 311 and the lead-out patterns 331 and 332 may be disposed on a lower surface of the support substrate 200 facing the sixth surface 106 of the body 100, and the second coil pattern 312 and the dummy lead-out patterns 341 and 342 may be disposed on an upper surface of the support substrate 200 opposing the lower surface of the support substrate 200. On the lower surface of the support substrate 200, the first coil pattern 311 may be in direct contact with and connected to the second lead-out pattern 332, and each of the first coil pattern 311 and the second lead-out pattern 332 may be disposed to be spaced apart from the first lead-out pattern 331. The second lead-out pattern 332 may be formed to extend from an outermost turn of the first coil pattern 311. The first lead-out pattern 331 may be exposed to the first surface 101 of the body 100 and the internal surface of the first slit portion S1. The first lead-out pattern 331 may be continuously exposed to the first surface 101 of the body 100 and the lower surface of the first slit portion S1. The second lead-out pattern 332 may be exposed to the second surface 102 of the body 100 and the internal surface of the second slit portion S2. The second lead-out pattern 332 may be continuously exposed to the second surface of the body 100 and the lower surface of the second slit portion S2. On the upper surface of the support substrate 200, the second coil pattern 312 may be in contact with and connected to the first dummy lead-out pattern 341, and each of the second coil pattern 312 and the first dummy lead-out pattern 341 may be disposed to be spaced apart from the second dummy lead-out pattern 342. The first dummy lead-out pattern 341 may be formed to extend from an outermost turn of the second coil pattern 312. The first dummy lead-out pattern 341 may be exposed to the first surface 101 of the body 100. The second dummy lead-out pattern 342 may be exposed to the second surface 102 of the body 100. The first via 321 may penetrate through the support substrate 200 to be in contact with an innermost turn of the first coil pattern 311 and an innermost turn of the second coil pattern 312. The second via 322 may penetrate through the support substrate to connect the first lead-out pattern 331 and the first dummy lead-out pattern 341 to each other. The third via 323 may penetrate through the support substrate 200 to connect the second lead-out pattern 332 and the second dummy lead-out pattern 342 to each other. As a result, the coil portion 300 may overall serve as a single coil.

Each of the coil patterns 311 and 312 may have a planar spiral shape having at least one turn formed about the core 110. As an example, the first coil pattern 311 may form at least one turn about the core 110 on one surface of the support substrate 200.

In the present embodiment, first lead-out pattern 331 may be exposed to a lower surface of the first slit portion S1 and may not be exposed to an internal wall of the first slit portion S1. The second lead-out pattern 322 may be exposed to a lower surface of the second slit portion S1 and may not be exposed to an internal wall of the second slit portion S2. The external electrodes 410 and 420 to be described later may be formed on the lower surfaces and the internal walls of the slit portions S1 and S2. Since the lead-out patterns 331 and 332 are exposed to the lower surfaces of the slit portions S1 and S2, the lead-out patterns 331 and 332 and the external electrodes 410 and 420 are in contact with and connected to each other. In the present embodiment, the lead-out patterns 331 and 332 are not exposed to the internal walls of the slit portions S1 and S2. For example, a depth of pre-dicing may be adjusted to expose the lower surfaces of the lead-out patterns 331 and 332 based on a direction of FIG. 4. Thus, loss of the volume of the body 100, for example, loss of a magnetic material, occurring due to the slit portions S1 and S2, may be significantly reduced.

In the lead-out patterns 331 and 332, regions exposed to the lower surfaces of the slit portions S1 and S2 may have higher surface roughness than other surfaces of the lead-out patterns 331 and 332. As an example, when the lead-out patterns 331 and 332 are formed using electroplating and then the slit portions S1 and S2 are formed in the body 100, a pre-dicing tip may be in contact with lower surfaces of the lead-out patterns 331 and 332 facing the sixth surface 106 of the body 100, and the lower surfaces of the lead-out patterns 331 and 332 may be polished by the pre-dicing tip. As will be described later, the external electrodes 410 and 420 may be formed as thin films to have poor coupling force to the lead-out patterns 331 and 332. Since the regions exposed to the lower surfaces of the slit portions S1 and S2 in the lead-out patterns 331 and 332 have relatively high surface roughness, coupling force between the lead-out patterns 332 and 332 and the external electrodes 410 and 420 may be enhanced.

At least one of the first and second lead-out patterns 331 and 332 may have a thickness greater than a thickness of each of the first coil pattern 31 and the first dummy lead-out pattern 341. As an example, referring to FIG. 4, a thickness h1 of the first lead-out pattern 331 may be greater than a thickness h2 of the first coil pattern 311. The first lead-out pattern 331 may be formed to have the thickness h1 greater than the thickness h2 of the first coil pattern 311, so that a depth of the first slit portion S1 for exposure of the first lead-out pattern 331 may be significantly reduced. Thus, loss of the volume of the body 100, for example, loss of a magnetic material, occurring due to the first slit portion S1, may be significantly reduced. The thickness h1 of the first lead-out pattern 331 may be greater than the thickness h3 of the first dummy lead-out pattern 341. The first lead-out pattern 331 may be formed to have the thickness h1 greater than the thickness h3 of the first dummy lead-out pattern 341, so that a volume of a magnetic material on an upper side of the body 100 may be sufficiently secured. Thus, necking of magnetic flux may be significantly reduced. The above description of the thickness h1 of the first lead-out pattern may be equivalently applied to the second lead-out pattern 332. For example, each of the first and second lead-out patterns 331 and 332 may have a thickness greater than a thickness of the first coil pattern 311. Accordingly, the slit portions S1 and S2 may have the same depth to increase ease of process. In addition, each of the first and second lead-out patterns 331 and 332 may have a thickness greater than a thickness of each of the first and second dummy lead-out patterns 341 and 342.

At least one of the coil patterns 311 and 312, the vias 321, 322, and 323, the lead-out patterns 331 and 332, and the dummy lead-out patterns 341 and 342 may include one or more conductive layers. As an example, when the first coil pattern 311, the lead-out patterns 331 and 332, and the vias 321, 322, and 323 are formed on a side of the lower surface of the support substrate 200 by plating, each of the first coil pattern 311, the lead-out patterns 331 and 332, and the vias 321, 322, and 323 may include a first conductive layer, formed by electroplating or the like, and a second conductive layer disposed on the first conductive layer. The first conductive layer may be a seed layer for forming the second conductive layer on the support substrate 200 by plating. The second conductive layer may an electroplating layer. In this case, the electroplating layer may have a single-layer structure or a multilayer structure. An electroplating layer having a multilayer structure may be formed to have a conformal layer structure in which one electroplating layer covers another electroplating layer or one electroplating layer is stacked on only one surface of another electroplating layer. The seed layer of the first coil pattern 311 and the seed layer of the first lead-out pattern 331 may be formed to be integrated with each other such that a boundary therebetween may not be formed, but the present disclosure is not limited thereto. The electroplating layer of the first coil pattern 311 and the electroplating layer of the first lead-out pattern 331 may be formed to be integrated with each other such that a boundary therebetween may not be formed, but the present disclosure is not limited thereto.

As an example, the coil patterns 311 and 312, the lead-out patterns 331 and 332, and the dummy lead-out patterns 341 and 342 may be formed to protrude from a lower surface and an upper surface of the support substrate 200, as illustrated in FIGS. 4 and 5. As another example, the first coil pattern 311 and the lead-out patterns 331 and 332 may be formed to protrude from the lower surface of the support plate 200, and the second coil pattern 312 and the dummy lead-out patterns 341 and 342 may be embedded in the upper surface of the support substrate 200 to expose upper surfaces thereof to the upper surface of the support substrate 200. In this case, a concave portion may be formed on at least one of an upper surface of the second coil pattern 312 and upper surfaces of the dummy lead-out patterns 341 and 342. Thus, the upper surface of the support substrate 200, the upper surface of the second coil pattern 312, and/or the upper surfaces of the dummy lead-out patterns 341 and 342 may not be substantially coplanar with each other.

Each of the coil patterns 311 and 312, the vias 321, 322, and 323, the lead-out patterns 331 and 332, and the dummy lead-out patterns 341 and 342 may be formed of a conductive material such as copper (Cu), aluminum (Al), silver (Ag), tin (Sn), gold (Au), nickel (Ni), lead (Pb), titanium (Ti), or alloys thereof, but the conductive material is not limited thereto.

Figure 7:
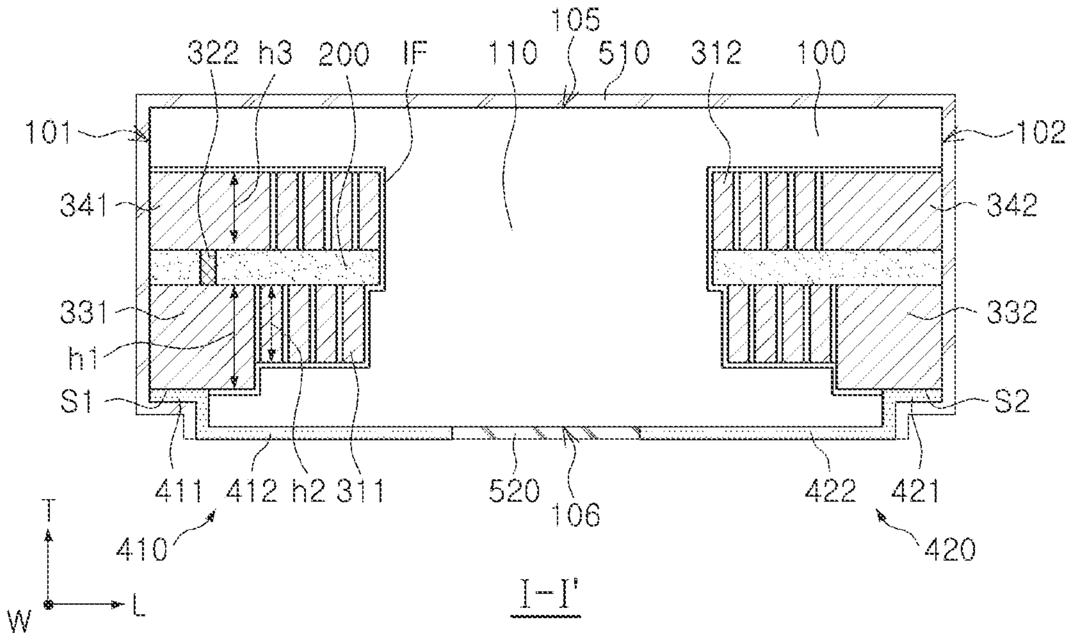
FIG. 7 is a schematic view illustrating another modified example of an exemplary embodiment of the present disclosure and corresponds to FIG. 4.
Figure 8:
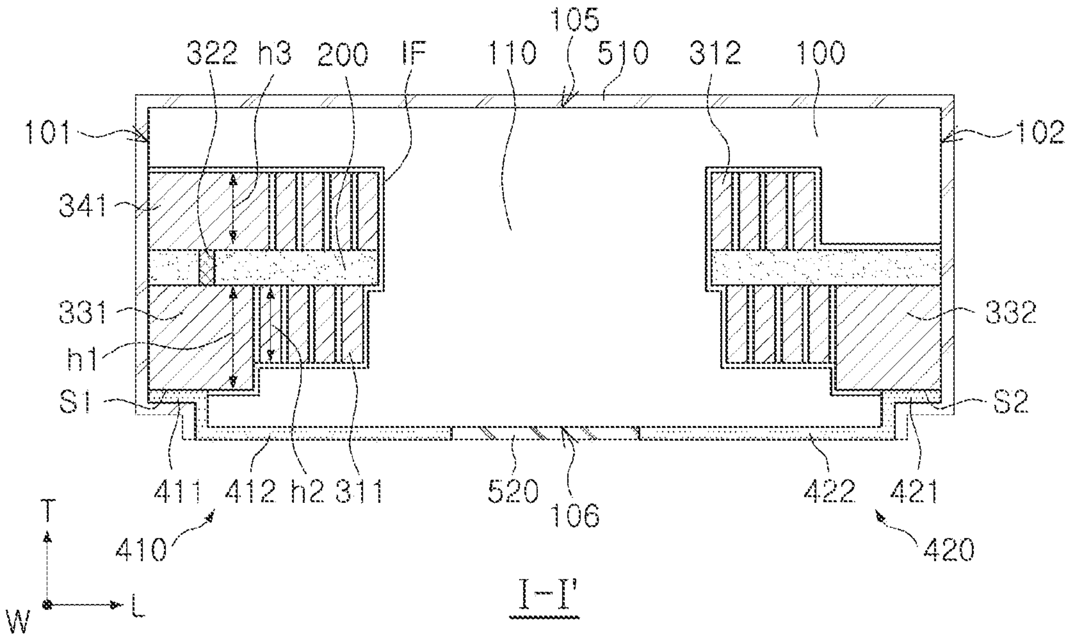
FIG. 8 is a schematic view illustrating another modified example of an exemplary embodiment of the present disclosure and corresponds to FIG. 4.

FIG. 7 is a schematic view illustrating another modified example of an exemplary embodiment of the present disclosure and corresponds to FIG. 4. FIG. 8 is a schematic view illustrating another modified example of an exemplary embodiment of the present disclosure and corresponds to FIG. 4.

A second dummy lead-out pattern 342 is irrelevant to electrical connection between the other elements of a coil portion 300, and thus, the second dummy lead-out pattern 342 and/or the third via 323 may be omitted.

For example, in a modified example of the present embodiment illustrated in FIG. 7, the third via 323 may be omitted, so that the second lead-out pattern 332 and the second dummy lead-out pattern 342 may not be connected to each other. In this modified example, the second dummy lead-out pattern 342, irrelevant to the electrical connection of the coil portion 300, may not be electrically connected to another element of the coil portion 300. In this modified example, warpage of the support substrate 200, which may occur when the second dummy lead-out pattern 342 is removed, may be prevented.

Alternatively, in the modified example illustrated in FIG. 8, the second dummy lead-out pattern 342 and the third via 323 may be omitted, and thus, a volume of a magnetic material in the body 100 may be increased by a volume corresponding to the second dummy lead-out pattern 342.

The external electrodes 410 and 420 may be disposed to be spaced apart from each other on one surface of the body 100, and may extend to first and second slit portions S1 and S2 to be connected to first and second lead-out patterns 331 and 332, respectively. Specifically, the first external electrode 410 may include a first connection portion 411, disposed on an internal surface of the first slit portion S1 to be in contact with and connected to the first lead-out pattern 331 exposed to a lower surface of the first slit portion S1, and a first pad portion 412 extending from the first connection portion 411 to the sixth surface 106 of the body 100. The second external electrode 420 may include a second connection portion 421, disposed on an internal surface of the second slit portion S2 to be in contact with and connected to the second lead-out pattern 332 exposed to a lower surface of the second slit S2, and a second pad portion extending from the second connection portion 421 to the sixth surface 106 of the body 100. The first pad portion 412 and the second pad portion 422 may be disposed to be spaced apart from each other on the sixth surface 106 of the body 100.

The external electrodes 410 and 420 may be formed along the internal surfaces of the slit portions S1 and S2, and the sixth surface 106 of the body 100, respectively. For example, the external electrodes 410 and 420 may be formed on the internal surfaces of the slit portions S1 and S2 and the sixth surface 106 of the body 100 in the form of a conformal layer. The external electrodes 410 and 420 may be formed to be integrated with the internal surfaces of the slit portions S1 and S2 and the sixth surface 106 of the body 100. To this end, the external electrodes 410 and 420 may be formed by a thin-film process such as a sputtering process or a plating process.

Each of the external electrodes 410 and 420 may be formed of a conductive material such as copper (Cu), aluminum (Al), silver (Ag), tin (Sn), gold (Au), nickel (Ni), lead (Pb), titanium (Ti), or alloys thereof, but the conductive material is not limited thereto. Each of the external electrodes 410 and 420 may be formed to have a single-layer structure and a multilayer structure. As an example, each of the external electrodes 410 and 420 may include a first layer including copper (Cu), a second layer formed on the first layer and including nickel (Ni), and a third layer formed on the second layer and including tin (Sn). The first layer may be formed by electroplating or vapor deposition such as sputtering, or by applying and curing a conductive paste including a conductive material such as copper (Cu), or the like. Each of the second and third layers may be formed by electroplating. The second layer may be formed to have a shape covering the connection portions 411 and 421 and the pad portions 412 and 422, or may be formed on only the pad portions 412 and 422. The third layer may also be formed to have a shape similar to the shape of the second layer.

An insulating film IF may insulate the coil patterns 311 and 312, the lead-out patterns 331 and 332, and the dummy lead-out patterns 341 and 342 from the body 100. The insulating film IF may include, for example, parylene, but the present disclosure is not limited thereto. The insulating film IF may be formed by a method such as vapor deposition, but the present disclosure is not limited thereto and the insulating film IF may be formed by laminating an insulating film on both surfaces of the support substrate 200. The insulating film IF may have a structure including a portion of a plating resist used to form the coil portion 300 using electroplating, but the present disclosure is not limited thereto.

A surface insulating layer 500 may be formed on surfaces of the body 100, and may be disposed on the slit portions S1 and S2 to cover the connection portions 411 and 421 in the external electrodes 410 and 420. Specifically, the surface insulating layer 500 may be disposed on the internal surfaces of the slit portions S1 and S2 and the first to sixth surfaces 101, 102, 103, 104, 105, and 106 of the body 100 while exposing regions, in which the pad portions 412 and 422 of the external electrodes 410 and 420 are disposed, in the sixth surface 106 of the body 100. Specifically, the surface insulating layer 500 may include a first insulating layer 510, disposed on each of the first to fifth surfaces 101, 102, 103, 104, and 105 and the internal surfaces of the slit portions S1 and S2, and a second insulating layer 520 disposed on the sixth surface 106 of the body 100 while exposing the pad portions 412 and 422 of the external electrodes 410 and 420. The first insulating layer 510 and the second insulating layer 520 may be formed in different processes such that a boundary therebetween may be formed, but the scope of the present disclosure is not limited thereto. In the first insulating layer 510, portions disposed on the first to fifth surfaces 101, 102, 103, 104, and 105 of the body 100 and portions disposed on the internal surfaces of the slit portions S1 and S2 are formed together in the same process such that boundaries therebetween may not be formed, but the present disclosure is not limited thereto.

The surface insulating layer 500 may be formed using a printing method, vapor deposition, a spray coating method, a film lamination method, or the like, but the present is not limited thereto. The surface insulating layer 500 may include a thermoplastic resin such as a polystyrene-based resin, a vinyl acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. The second insulating layer 520, included in the surface insulating layer 500, may be formed on the body 100 before a process for forming the external electrodes 410 and 420, serving as a mask when the external electrodes 410 and 420 are formed, but the present disclosure is not limited thereto.

Therefore, the coil component 1000 according to the present embodiment may easily implement a lower electrode structure while reducing a size of a coil component. That is, unlike the related art, the external electrodes 410 and 420 are not formed to protrude from both end surfaces 101 and 102 or both side surfaces 103 and 104 of the body 100, and thus, an overall length and an overall width of the coil component 1000 are not increased. In addition, since the external electrodes 410 and 420 are formed by a thin-film process, each of the external electrodes 410 and 420 may have a relatively small thickness to significantly suppress an increase in thickness of the coil component 1000. In addition, since the coil component 1000 according to the present embodiment, the lead-out patterns 331 and 332 are exposed to only the lower surfaces of the slit portions S1 and S2 and are not exposed to the internal walls of the slit portions S1 and S2, loss of the body 100 may be significantly reduced.

Figure 6:
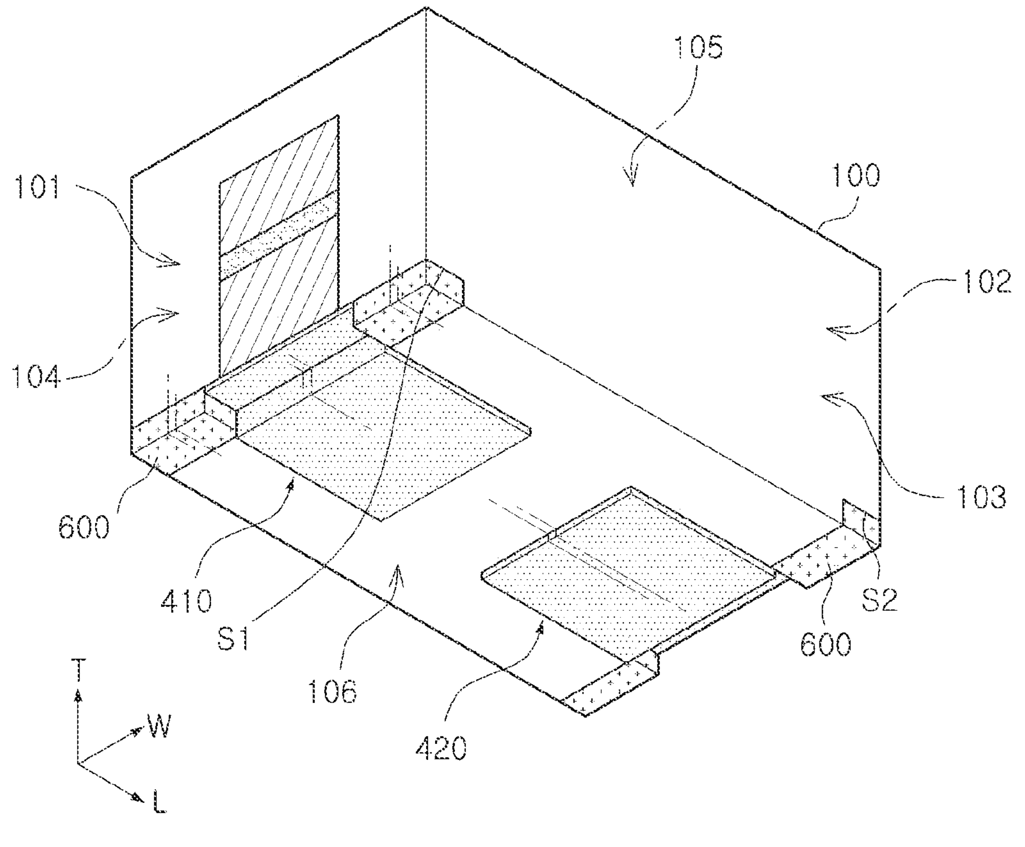
FIG. 6 is a schematic view illustrating a modified example of an exemplary embodiment of the present disclosure and corresponds to FIG. 2.

FIG. 6 is a schematic view illustrating a modified example of an exemplary embodiment of the present disclosure and corresponds to FIG. 2.

Referring to FIG. 6, a coil component according to this modified example may further include filling portions 600. In this modified example, connection portions 411 and 421 of external electrodes 410 and 420 may be disposed on a central portion of a body 100 in a width direction W and extend onto central portions of internal surfaces of slit portions S1 and S2 in the width direction W, so as to be connected to lead-out patterns 331 and 332, respectively. Each of the external electrodes 410 and 420 may be spaced apart from the third and fourth surfaces 103 and 104 in the width direction W. The filling portions 600 may be disposed in regions, in which the connection portions 411 and 421 are not disposed, in the internal surfaces of the slit portions S1 and S2. The slit portions S1 and S2 may be formed in an overall width direction W of the body 100 for ease of process, but are provided to connect the lead-out patterns 331 and 332 and the connection portions 411 and 421 of the external electrodes 410 and 420 to each other. In this regard, the internal surfaces of the slit portions S1 and S2 do not need to be exposed outwardly of the body 100 in the width direction W of the body 100. In this modified example, the connection portions 411 and 421 may be disposed in the central portion of the body 100 in the width direction Win the internal surfaces of the slit portions S1 and S2 to provide a connection between the coil portion 300 and the external electrodes 410 and 420, and the filling portions 600 may be disposed in the regions, in which the connection portions 411 and 421 are not disposed, in the internal surfaces of the slit portions S1 and S2 to prevent plating dispersal during formation of the connection portions 411 and 421. In addition, the filling portions 600 may fill at least portion of the internal surfaces of the slit portions S1 and S2 to significantly suppress insufficient formation of surface insulating layers 500.

One surface of the filling portion 600 may be substantially coplanar with first and second surfaces 101 and 102, both end surfaces of the body 100, and third and fourth surfaces 103 and 104, both side surfaces of the body 100.

The filling portion 600 may include an insulating resin. The resin may include epoxy, polyimide, a liquid crystal polymer, or the like, in a single or combined form, but is not limited thereto.

The filling portion 600 may further include magnetic powder particles dispersed in the insulating resin. The magnetic powder particles may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the magnetic metal powder particle may be an Fe—Si—B—Cr-based amorphous alloy powder, but is not limited thereto.

Each of the magnetic metal powder particles 10 may have an average diameter of about 0.1 μm to 30 μm, but is not limited thereto.

Another Embodiment

Figure 9:
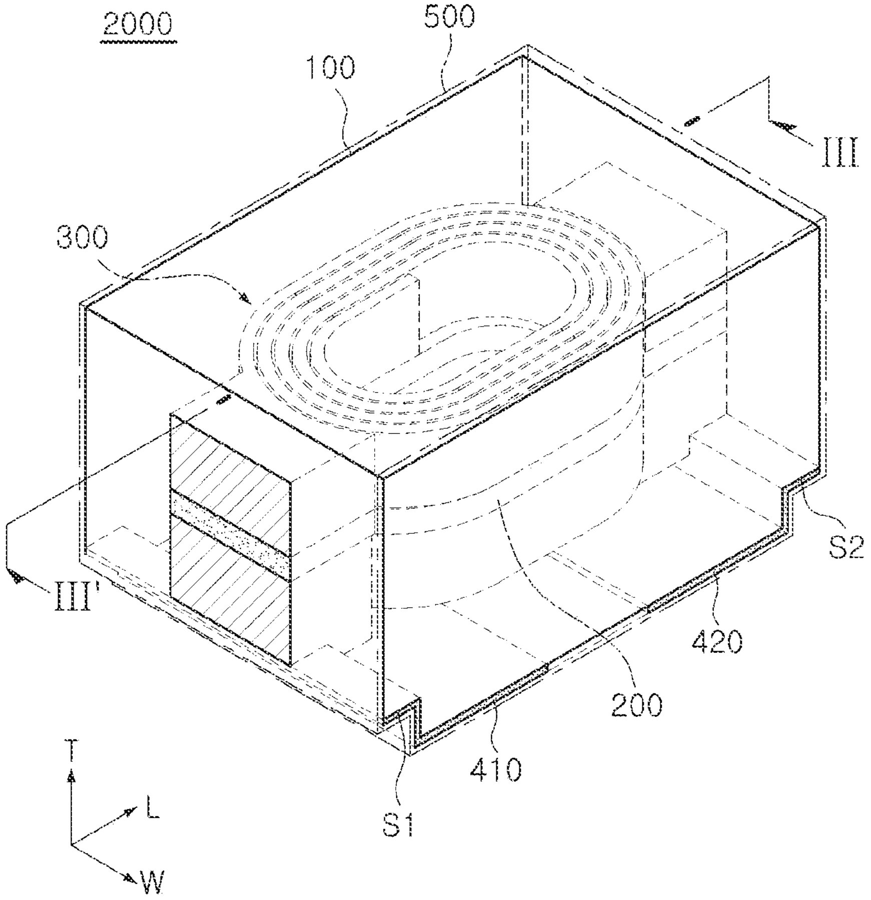
FIG. 9 is a schematic perspective view of a coil component according to another exemplary embodiment of the present disclosure.
Figure 10:
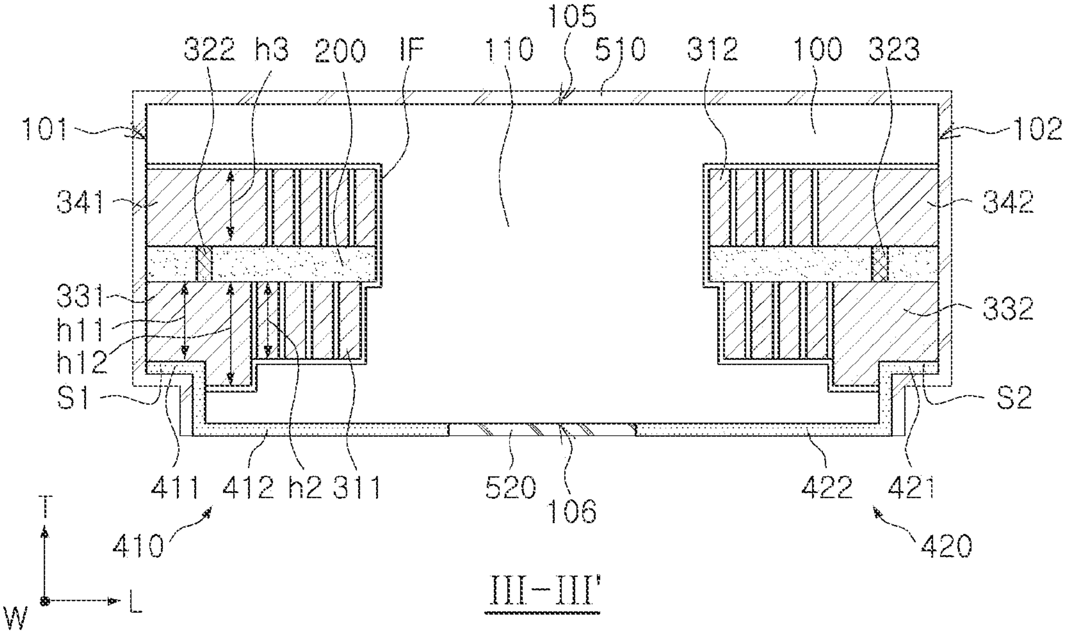
FIG. 10 is a cross-sectional view taken along line III-III' of FIG. 9.

FIG. 9 is a schematic perspective view of a coil component according to another exemplary embodiment of the present disclosure. FIG. 10 is a cross-sectional view taken along line III-III' of FIG. 9.

Referring to FIGS. 1 to 5 and FIGS. 9 and 10, a difference between a coil component 2000 according to a second embodiment and the coil component 1000 according to the first embodiment lies in slit portions S1 and S2. Therefore, the present embodiment will be described while focusing on only the slit portions S1 and S2. The description of the first embodiment will be applied to the description of the other configurations of the second embodiment as is.

Referring to FIGS. 9 and 10, the slit portions S1 and S2, applied to the present embodiment, may be formed to extend to at least a portion of each of lead-out patterns 321 and 332. Accordingly, the lead-out pattern 331 may have a first region onto which the slit portion S1 is formed to extend, and a second region onto which the slit portions S1 is not formed to extend, and the lead-out pattern 332 may have a first region, onto which the slit portion S2 is formed to extend, and a second region onto which the slit portion S2 is not formed to extend. In other words, the first regions of the slit portion S1 and S2 may be exposed to an outside of the body 100 and disposed in an outer side than the second regions in the length direction L, and the slit portion S1 and S2 may overlap the first regions and may not overlap the second regions in the thickness direction T. Since the first region is a region in which the slit portion S1/S2 is formed to extend to at least a portion of the lead-out pattern 331/332, the second region may have a thickness h12 greater than a thickness h11 of the first region. In the present embodiment, the thickness h21 of the second region of each of the lead-out patterns 331 and 332 may be greater than a thickness h1 of a first coil pattern 311 and greater than a thickness h3 of a first dummy lead-out pattern 341.

In the present embodiment, since each of the slit portions S1 and S2 is formed to extend to at least a portion of each of the lead-out patterns 331 and 332, the lead-out patterns 331 and 332 may be exposed to not only lower surfaces of the slit portions S1 and S2 but also internal walls of the slit portions S1 and S2. Thus, a contact area between each of the lead-out patterns 331 and 332 and each of external electrodes 410 and 420 may be increased to improve coupling force therebetween.

As described above, according to exemplary embodiments, an effective volume of a body may be increased.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface, and a first end surface and a second end surface connected to the first surface and opposing each other in a length direction;

a support substrate disposed inside the body spaced apart from the first surface in a thickness direction;

a coil portion comprising a first coil pattern and first and second lead-out patterns, each disposed on a first surface of the support substrate facing the first surface of the body, and a second coil pattern and a first dummy lead-out pattern, each disposed on a second surface of the support substrate opposing the first surface of the support substrate;

a first slit portion and a second slit portion, respectively defined on an edge portion between the first end surface and the first surface of the body and an edge portion between the second end surface and the first surface of the body to expose the first lead-out pattern and the second lead-out pattern; and a first external electrode and a second external electrode disposed to be spaced apart from each other on the first surface of the body in the length direction, and respectively extending onto the first slit portion and the second slit portion to be connected to the first lead-out pattern and the second lead-out pattern, wherein at least one of the first lead-out pattern or the second lead-out pattern has a thickness greater than a thickness of each of the first coil pattern and the first dummy lead-out pattern, wherein a depth of the first and second slit portions in the thickness direction is less than or equal to a distance in the thickness direction between the first surface and the first coil pattern.

2. The coil component of claim 1, wherein each of the first and second lead-out patterns has a thickness greater than the thickness of the first coil pattern.

3. The coil component of claim 1, wherein each of the first and second lead-out patterns has a thickness greater than the thickness of the first dummy lead-out pattern.

4. The coil component of claim 1, wherein the first and second slit portions are formed to extend onto at least a portion of the first lead-out pattern and at least a portion of the second lead-out pattern, respectively, the first lead-out pattern has a first region onto which the first slit portion is formed to extend, and a second region onto which the first slit portion is not formed to extend, and the second lead-out pattern has a first region onto which the second slit portion is formed to extend, and a second region onto which the second slit portion is not formed to extend, and at least one of the second regions of the first and second lead-out patterns has a thickness greater than a thickness of the first coil pattern.

5. The coil component of claim 4, wherein the second lead-out pattern is connected to the first coil pattern on the first surface of the support substrate, the first lead-out pattern is disposed to be spaced apart from each of the first coil pattern and the second lead-out pattern on the first surface of the support substrate, and the first dummy lead-out pattern is connected to the second coil pattern on the second surface of the support substrate.

6. The coil component of claim 5, wherein the coil portion further comprises:

a first via penetrating through the support substrate and connecting innermost end portions of the first and second coil patterns to each other; and a second via penetrating through the support substrate and connecting the first lead-out pattern and the first dummy lead-out pattern to each other.

7. The coil component of claim 6, wherein the coil portion further comprises:

a second dummy lead-out pattern disposed to be spaced apart from each of the second coil pattern and the first dummy lead-out pattern on the second surface of the support substrate.

8. The coil component of claim 7, wherein the coil portion further comprises:

a third via penetrating through the support substrate and connecting the second lead-out pattern and the second dummy lead-out pattern to each other.

9. The coil component of claim 1, wherein the first and second external electrodes are disposed on a central portion of the body in a width direction, perpendicular to the length direction, and extend on center portions of internal surfaces of the first and second slit portions, respectively, in the width direction, and wherein the coil component further comprises filling portions, respectively disposed on external sides of the central portions of the internal surfaces of the first and second slit portions.

10. The coil component of claim 9, wherein each of the filling portions includes a magnetic material.

11. The coil component of claim 9, wherein each of the filling portions has a first surface and a second surface opposing each other, the first surface of each of the filling portions being in contact with a respective internal surface of the first and second slit portions, and the first end surface and the second end surface of the body are substantially coplanar with the second surfaces of the filling portions, respectively.

12. The coil component of claim 1, further comprising:

insulating layers, respectively disposed on the first and second slit portions to cover portions of the first and second external electrodes extending onto the first and second slit portions.

13. The coil component of claim 1, wherein the body further includes a second surface opposing the first surface in a thickness direction of the body, and third and fourth surfaces connecting the first surface to the second surface of the body and opposing each other in a width direction perpendicular to the length and thickness directions, and each of the first and second external electrodes is spaced apart from the third and fourth surfaces in the width direction.

14. The coil component of claim 13, wherein widths of the first and second external electrodes are greater than widths of the first and second lead-out patterns.

15. A coil component comprising:

a body having a first surface, and a first end surface and a second end surface connected to the first surface and opposing each other in a length direction;

a support substrate disposed inside the body;

a coil portion disposed on one surface of the support substrate in a thickness direction, the coil portion comprising a coil body and a lead-out pattern extending from one end of the coil body and exposed to the first or second end surface in the length direction;

a dummy lead-out pattern disposed on the one surface of the support substrate, not connected to the coil body;

a slit portion defined on an edge portion between the first or second end surface and the first surface of the body to expose the lead-out pattern; and an external electrode disposed on the first surface of the body, and extending onto the slit portion to be connected to the lead-out pattern, wherein the lead-out pattern has at least a portion, a thickness of which is greater than a thickness of the coil body and the dummy lead-out pattern in the thickness direction, wherein a depth of the slit portion in the thickness direction is less than or equal to a distance in the thickness direction between the first surface and the coil portion.

16. The coil component of claim 15, wherein a thickness of an entire portion of the lead-out pattern is greater than the thickness of the coil body.

17. The coil component of claim 15, wherein the lead-out pattern includes a first region and a second region, the first region is exposed to an outside of the body and disposed in an outer side than the second region in the length direction, and the slit portion overlaps the first region and does not overlap the second region in the thickness direction.

18. The coil component of claim 17, wherein a thickness of the second region is larger than a thickness of the first region.

* * * * *